Nov. 23, 1965   R. K. A. SCHENCK ETAL   3,219,154
OVERLOAD PROTECTION DEVICE FOR HOISTS WITH AN AXIAL LOAD BRAKE
Filed Aug. 27, 1962   2 Sheets-Sheet 1

INVENTORS
R.K.A. SCHENCK
H.E. SCHEEL
BY

Nov. 23, 1965    R. K. A. SCHENCK ETAL    3,219,154
OVERLOAD PROTECTION DEVICE FOR HOISTS WITH AN AXIAL LOAD BRAKE
Filed Aug. 27, 1962    2 Sheets-Sheet 2
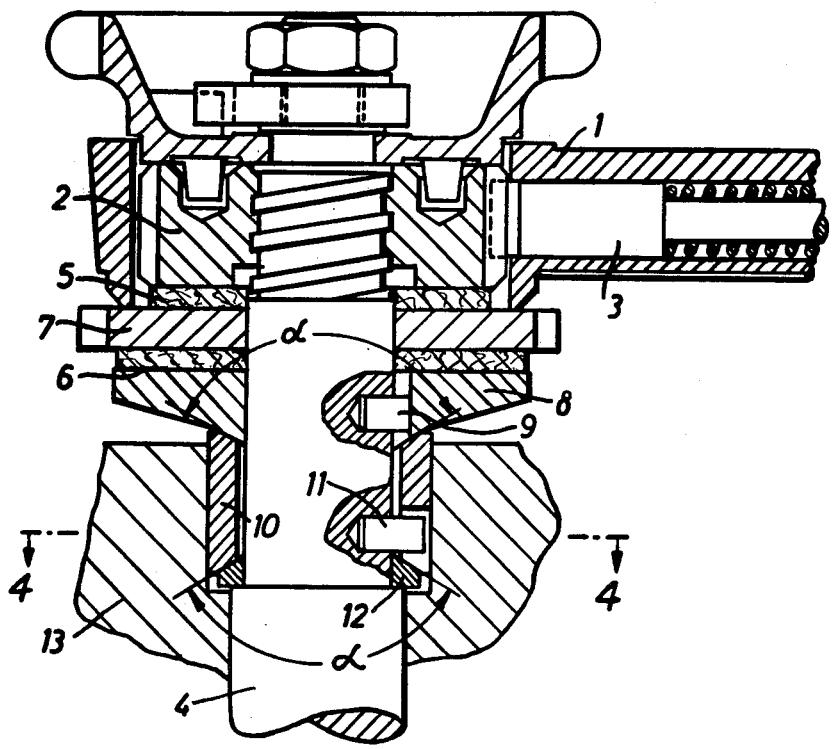
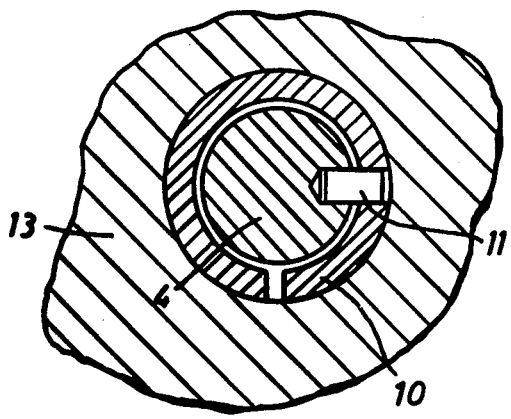
INVENTORS
R.K.A. SCHENCK
H.E. SCHEEL
BY United States Patent Office 3,219,154
Patented Nov. 23, 1965

3,219,154
OVERLOAD PROTECTION DEVICE FOR HOISTS
WITH AN AXIAL LOAD BRAKE
Robert K. A. Schenck and Hans Ernst Scheel, Velbert, Rhineland, Germany, assignors, by mesne assignments, to Yale & Towne, Inc., New York, N.Y., a company of Ohio
Filed Aug. 27, 1962, Ser. No. 219,793
10 Claims. (Cl. 188—134)

This invention relates to an overload protection device for hoists of the class having a rotating lift shaft with an axial load brake. A brake of that kind is shown for example in the patent to Schroeder, No. 2,165,984. To eliminate the dangers caused by overloaded hoists, various kinds of overload protection devices have been suggested. There are shearing pin safety devices with a shearing pin in the operating mechanism of the hoist which will be sheared off when the permissible maximum load is reached, hereby disconnecting the operating mechanism of the hoist. Such shearing pin safety devices though, cannot be adjusted accurately and are not easy to work with, because of the necessity to replace the shearing pin.

There are also slipping clutches, which, when a previously adjusted maximum torque is exceeded, will slip and thus render the hoist inoperative.

These slipping clutches consist of two friction halves which are held together by spring pressure. An overload will cause slippage of the halves. These slipping clutches have a disadvantage, insofar as an accurate adjustment of a load is difficult because of the normally existing variations between clutch parts. If it is desired to manufacture precise and reliably working overload protection devices of this kind, truing of the binding clutch parts will be necessary. This is expensive, though, and makes an exchange of clutch parts impossible. In addition, it is often possible for the operator to change the adjustment on these kinds of overload protection devices, which will render the devices ineffective.

It is very disadvantageous, quite often even extremely dangerous, when shearing pin safety devices and slipping clutches are suddenly rendered inoperative by an overload, since this is accompanied by a sudden slipping of the operating handle of the hoist. For example, when working on swaying scaffolds at great heights where the operator does not have a firm stand, working with hoists that have such an overload protection device is dangerous and may cause bad accidents.

In the present invention which is suitable for hoists with an axial load brake, the aforementioned disadvantages of heretofore known overload protection devices are avoided by means of a sleeve, which is placed between an axially moveable disc member of the load brake and a collar on the lift shaft or a recess in the hoist housing, and wherein, when a preset hoist load is reached, the disc member, which is under axial pressure, will compress the sleeve axially, thereby expand it radially, and thus lock the lift shaft. The sleeve can be made of elastic material with a large coefficient of friction, which, when the preset load is reached, will be pressed against a suitably shaped recess in the hoist housing or against the lift shaft, and thus lock the shaft.

It is especially advantageous to use a slotted resilient type of sleeve, which is either connected to the lift shaft or to the housing in such a way, that these parts will rotate as a unit. When the preset load is reached, said sleeve will either be radially expanded and pressed against a suitably shaped recess in the hoist housing or be compressed and pressed against the lift shaft by means of the disc member which is under axial load, the tapered end of said disc member as well as the chamfer on the sleeve, and thus lock said shaft.

With this device, as compared with other devices which have become known so far, no sudden slipping of the operating mechanism and the handle will occur, since the operating mechanism and the handle are simply locked against movement, so that dangerous jerky movements which could cause the operator to loose his balance, will be avoided.

It will also be recognized, that a device according to this invention is extremely sturdy and simple, and is relatively inexpensive to manufacture. This results from the fact that truing of binding clutch surfaces is avoided. The necessary chamfers on the slotted yielding sleeve, through which the sleeve receives its binding pressure, can be kept relatively small, and are therefore easier and less expensive to machine than the binding surfaces on slipping clutches known so far.

Another improvement of a device according to this invention is that its adjustment cannot be changed or rendered ineffective by the operator.

It has been found that it is especially advantageous to use a slotted yielding sleeve made of steel and provided with a friction coating having a large coefficient of friction. It is also possible to provide the surface on the lift shaft or in the hoist housing, which, when the preset load is reached, mates with the friction surface on the sleeve, with a friction coating having a coefficient of friction adjusted to that of the sleeve.

According to a preferred design version it is possible to place a ring between the collar on the lift shaft and the yielding sleeve, and to chamfer the ring and the disc member on the yielding sleeve facing side, and to chamfer the ends of the sleeve accordingly.

This design, wherein the slotted yielding sleeve is pressed radially against the hoist housing, permits a most simple arrangement of the necessary chamfers. With this design, it is very practical to connect the yielding sleeve with the lift shaft by means of a pin in such a way that the parts will rotate as a unit. For all designs, it is recommended to connect the disc member with the lift shaft by means of a pin, which is secured in a shaft hole and which extends into a keyway of the disc member, hereby allowing the disc member to move in an axial direction.

The invention is further described below in conjunction with the accompanying drawings, wherein:

FIG. 2 is a sectional view of the mechanism according to FIG. 1, but subjected to an overload.

FIG. 4 is a sectional view taken on the line 4—4 of FIG. 2.

Figure 1:
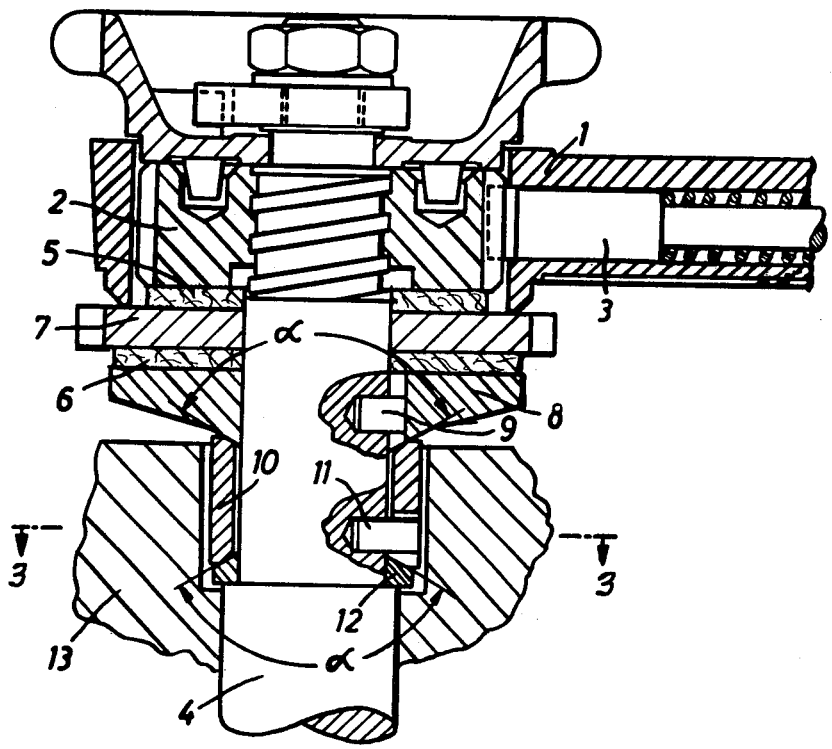
FIG. 1 is a sectional view of the operating and load brake mechanism of a hoist incorporating the overload protection device of the invention, and showing the mechanism subjected to a normal load.
Figure 3:
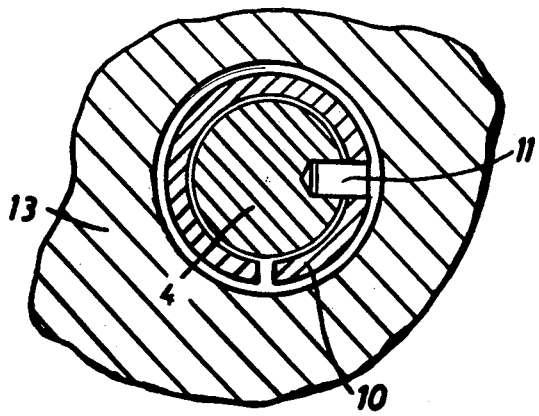
FIG. 3 is a sectional view taken on the line 3—3 of FIG. 1.

Referring now more particularly to FIG. 1 of the drawings, we show a brake hub 2 that is rotated by a lever acting through a pawl 3, as is normal in hoists of the particular class. The brake hub 2 is screw-threaded on a hoist lift shaft 4 and will rotate the shaft in lifting direction while also acting in an axial direction to press a one-way ratchet 7 toward a disc member 8. A pin 9 is engaged in a keyway in disc member 8 to secure that member against rotation on the shaft 4 while allowing disc member 8 to move axially on the shaft. However, disc member 8 does accept the axial pressure of the ratchet 7, that member 8 being supported in a manner that will become clear as our description proceeds. As will be appreciated, the degree of axial pressure applied by ratchet 7 to disc member 8 will depend on the load lifted by the lift shaft 4. Interposed friction discs 5 and 6 become effective between hub 2, ratchet 7, and disc member 8 upon the application of axial pressure, and a pawl (not shown) coacts with ratchet 7 to prevent reverse rotation of the ratchet. The friction discs 5, 6 naturally will allow yielding or free running of lift shaft 4 upon reduction of the axial pressure. Those skilled in the art will recognize that the construction thus far described comprises a type of brake which frequently is used on hoists, and which is shown in the Schroeder patent we mentioned earlier. We believe, therefore, that the brake will be readily understood and that it need not be described in further detail.

A slotted sleeve 10 of yielding material is located on lift shaft 4 and in a recess of housing 13. By coupling the sleeve to the drive shaft through a pin 11 these parts will rotate as a unit. The ends of the yielding sleeve 10 are chamfered to form inclined cam surfaces with a certain angle α. These chamfers mate with chamfers or cams on disc member 8 and on ring 12, the latter of which is placed between the yielding sleeve 10 and a collar on the pinion drive shaft 4. Thus, the sleeve 10 will accept the axial pressure applied by ratchet 7 to disc member 8 and will support that member, but can yield in a manner that we shall now describe.

The disc member 8 and ring 12 will wedge the slotted yielding sleeve 10 and thus deform the yielding material of the sleeve expand it radially toward housing 13 when axial pressure is brought to bear on the disc member. When this will happen depends on the thickness and the material of the sleeve, angle α between chamfers, and the diameter of the recess in the housing 13. These factors are chosen to allow the yielding sleeve 10 to expand slightly when lift shaft 4 is subjected to a normal load but to prevent sleeve 10 from engaging the wall of the recess 13. Upon reaching the predetermined overload the axial force will by means of disc member 8 and ring 12 wedge and expand the yielding sleeve 10 radially against the wall of the recess 13, as is shown in FIG. 2. Because of the frictional binding of housing 13 with resilient sleeve 10 on one side and the coupling of yielding sleeve 10 with the lift shaft 4 by means of pin 11 on the other, the lift shaft will be locked against rotation and thus the hoist cannot be operated.

To lower a load that is too heavy but that has been slightly raised, it is only necessary to release the load brake, which results in a release of the yielding sleeve 10 and an unlocking of the hoist operating mechanism, so as to allow the lift shaft 4 to rotate in a lowering direction.

It is obvious that all parts for the overload protection device may be simple and inexpensive to manufacture and still guarantee a safe functioning of the device. Apart from the already mentioned advantages, it is also important that the size of a hoist will not be increased by adding an overload protection device, since all parts necessary for this device will fit into the space ordinarily provided by hoists of this type.

We claim:

1. In a hoist of the class described having a lift shaft and a brake through which the lift shaft is rotated for lifting a load, said brake including a ratchet and a disc member to which said ratchet applies axial pressure depending on the load lifted by the shaft, the improvement that comprises means mounting the disc member for axial movement on said shaft in response to the pressure applied by the ratchet, and locking means mounted with respect to said shaft which is actuated by movement of said disc member beyond a predetermined distance for locking the lift shaft against rotation.

2. In a hoist of the class described having a lift shaft and a brake through which the lift shaft is rotated for lifting a load, said brake including a ratchet and a disc member to which said ratchet applies axial pressure depending on the load lifted by the shaft, the improvement that comprises means mounting the disc member on said shaft to axially yield in response to a predetermined degree of pressure applied by the ratchet, and means mounted with respect to said shaft which is actuated by the yielding of said disc member for locking the lift shaft against rotation.

3. In a hoist of the class described having a housing, a lift shaft rotatable in said housing, and a brake through which the lift shaft is rotated for lifting a load, said brake including a ratchet and a rotating disc member to which said ratchet applies axial pressure depending on the load lifted by the shaft, the improvement that comprises means mounting the disc member for axial movement on said shaft in response to the pressure applied by the ratchet, locking means mounted with respect to said shaft arranged to act between the lift shaft and the housing, and means operable by movement of said disc member beyond a predetermined distance to actuate said locking means so as to lock the lift shaft against rotation.

4. In a hoist of the class described having a housing, a lift shaft rotatable in said housing, and a brake through which the lift shaft is rotated for lifting a load, said brake including a ratchet and a disc member rotating with the lift shaft and to which said ratchet applies axial pressure in a degree depending on the load lifted by said shaft, the improvement that comprises means mounting the disc member for yielding movement in response to the pressure applied by the ratchet, locking means arranged to act between the lift shaft and the housing, and means through which the disc member is effective when yielding a predetermined degree to actuate said locking means so as to lock the lift shaft against rotation.

5. In a hoist of the class described having a housing, a lift shaft rotatable in said housing, and a brake through which the lift shaft is rotated for lifting a load, said brake including a ratchet and a disc member to which said ratchet applies axial pressure depending on the load lifted by the shaft, the improvement that comprises a yielding member arranged in a recess between parts of the hoist housing and the lift shaft, said yielding member formed to have clearance in said recess to allow the shaft normally to rotate in the housing, coacting surfaces through which the yielding member accepts from the disc member the pressure applied by the ratchet, and a predetermined degree of said pressure deforming the yielding member into position acting between the shaft and housing in said recess so as to lock the shaft against rotation.

6. In a hoist of the class described having a housing, a lift shaft rotatable in said housing, and a brake through which the lift shaft is rotated for lifting a load, said brake including a ratchet and a disc member to which said ratchet applies axial pressure in a degree depending on the load lifted by the shaft, the improvement that comprises a sleeve of yielding material arranged in a recess about the lift shaft in the hoist housing, said sleeve formed to have clearance in the recess and normally allowing the shaft to rotate in the housing, coacting end surfaces through which the sleeve accepts from the disc member the axial pressure applied by the ratchet so as to deform the yielding material of said sleeve in a radial direction, and said sleeve when deformed a predetermined degree acting between the lift shaft and housing in said recess to lock said shaft against rotation.

7. In a hoist of the class described having a housing, a lift shaft rotatable in said housing, and a brake through which the lift shaft is rotated for lifting a load, said brake including a ratchet and a disc member to which said ratchet applies axial pressure depending on the load lifted by the shaft, the improvement that comprises means mounting the disc member for movement in an axial direction, an expansible sleeve rotating with the lift shaft, a part of the hoist housing formed with a surface encircling said sleeve, coacting cam surfaces through which the disc member applies the pressure of the ratchet to the sleeve for expanding said sleeve, and said sleeve when expanded a predetermined degree coacting with the encircling surface on the housing to lock the shaft against rotation.

8. In a hoist of the class described having a housing, a lift shaft rotatable in said housing, and a brake through which the lift shaft is rotated for lifting a load, said brake including a ratchet and a disc member to which said ratchet applies axial pressure depending on the load lifted by the shaft, the improvement that comprises means mounting the disc member for movement in an axial direction, a circular member of yielding material arranged in a recess about the lift shaft in the hoist housing, surfaces coacting with opposed end surfaces of the circular member on the disc member and lift shaft so as to deform said circular member in a radial direction while accepting the pressure applied by the ratchet, and said circular member when deformed a predetermined degree acting between the shaft and housing in said recess so as to lock the shaft against rotation.

9. In a hoist of the class described having a housing, a lift shaft rotatable in said housing, and a brake through which the lift shaft is rotated for lifting a load, said brake including a ratchet and a rotating disc member to which said ratchet applies axial pressure in a degree depending on the load lifted by the shaft, the improvement that comprises means keying the disc member to rotate with the lift shaft while movable in an axial direction, an expansible slotted sleeve arranged in a recess about the lift shaft in the hoist housing, means keying the sleeve to the shaft, said sleeve formed to have clearance normally allowing free rotation of the shaft in the housing, cam surfaces coacting with opposed end surfaces of the sleeve on the disc member and lift shaft so that said shaft accepts through said sleeve the pressure applied by the ratchet, said cam surfaces being so inclined that the pressure expands the slotted sleeve, and said sleeve when expanded a predetermined degree engaging the surface of the housing in said recess so as to lock the lift shaft against rotation.

10. In a hoist of the class described, a housing, a lift shaft rotatable relatively to said housing for lifting a load, drive means, yielding means through which the drive means rotate the lift shaft, the degree of yielding depending on the load lifted by said shaft, and locking means mounted with respect to said shaft actuated by a predetermined degree of yielding of said yielding means for locking said lift shaft against rotation relatively to the housing.

References Cited by the Examiner
UNITED STATES PATENTS

| | | | |
|---|---|---|---|
| 1,224,882 | 5/1917 | Ljungstrom | 188—67 |
| 1,637,383 | 8/1927 | Livergood | 188—67 |
| 2,202,137 | 5/1940 | Brown | 188—134 |
| 2,303,312 | 11/1942 | Sheffield | 188—67 X |
| 2,348,611 | 5/1944 | Davidson | 188—67 |
| 2,378,173 | 6/1945 | Bazley | 188—67 |
| 2,894,610 | 7/1959 | Harrington | 188—134 |

ARTHUR L. LA POINT, *Primary Examiner.*

ABRAHAM G. STONE, DUANE A. REGER, EUGENE G. BOTZ, *Examiners.*